United States Patent [19]
Albert

[11] 3,721,404
[45] March 20, 1973

[54] HELICOPTER FLOATING STABILATOR CONTROL SYSTEM

[75] Inventor: Aristide A. Albert, Stratford, Conn.

[73] Assignee: United Aircraft Corporation, East Hartford, Conn.

[22] Filed: Nov. 10, 1971

[21] Appl. No.: 197,253

[52] U.S. Cl..................................244/17.19, 416/98
[51] Int. Cl..............................................B64c 27/04
[58] Field of Search..244/17.19, 17.21, 17.23, 17.25, 244/17.11, 17.13, 17.15, 17.17, 7 A, 7 R, 90 R; 416/98

[56] References Cited

UNITED STATES PATENTS

| | | | |
|---|---|---|---|
| 2,630,985 | 3/1953 | Sherry | 244/17.19 |
| 3,081,052 | 3/1963 | Michel | 244/17.19 |
| 3,105,659 | 10/1963 | Stutz | 244/17.19 X |

Primary Examiner—Milton Buchler
Assistant Examiner—Paul E. Sauberer
Attorney—Russell M. Lipes, Jr.

[57] ABSTRACT

Control system for a free floating stabilator for a helicopter having a control coupling to the longitudinal cyclic control linkage with provision for freeing the stabilator from controlled movement during flight operation such as hover so that the stabilator can assume a position providing minimum vertical drag.

8 Claims, 4 Drawing Figures

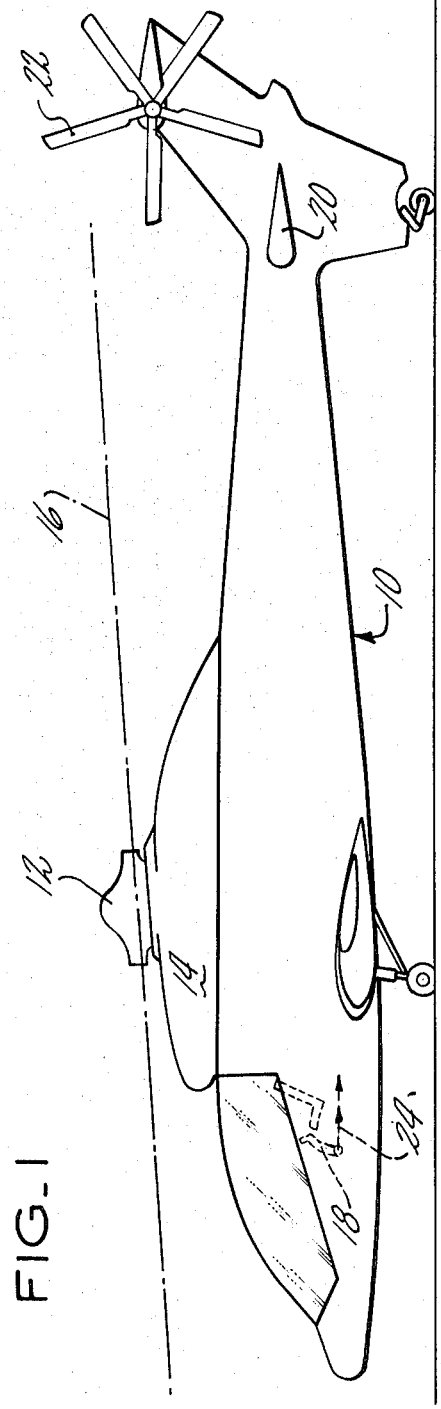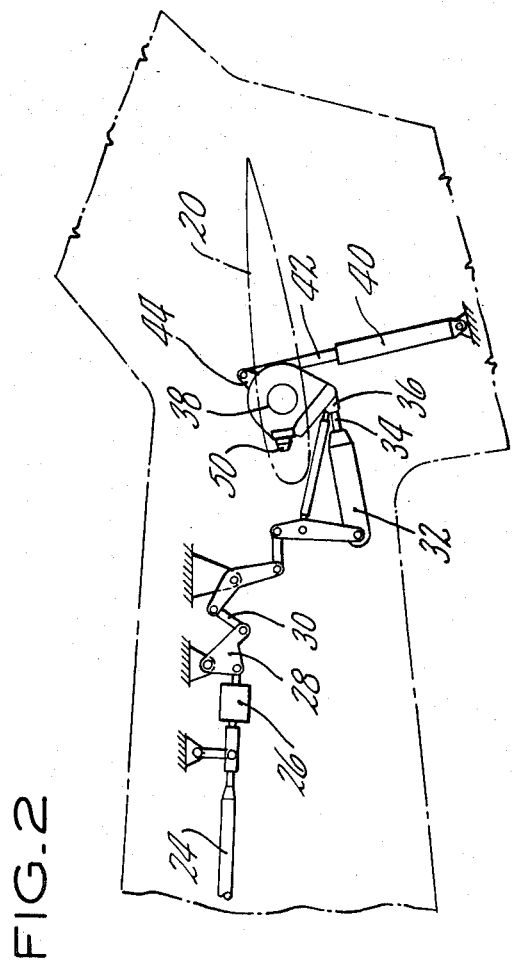
FIG.1
FIG.2
INVENTOR
ARISTIDE A. ALBERT
BY [signature]
ATTORNEY

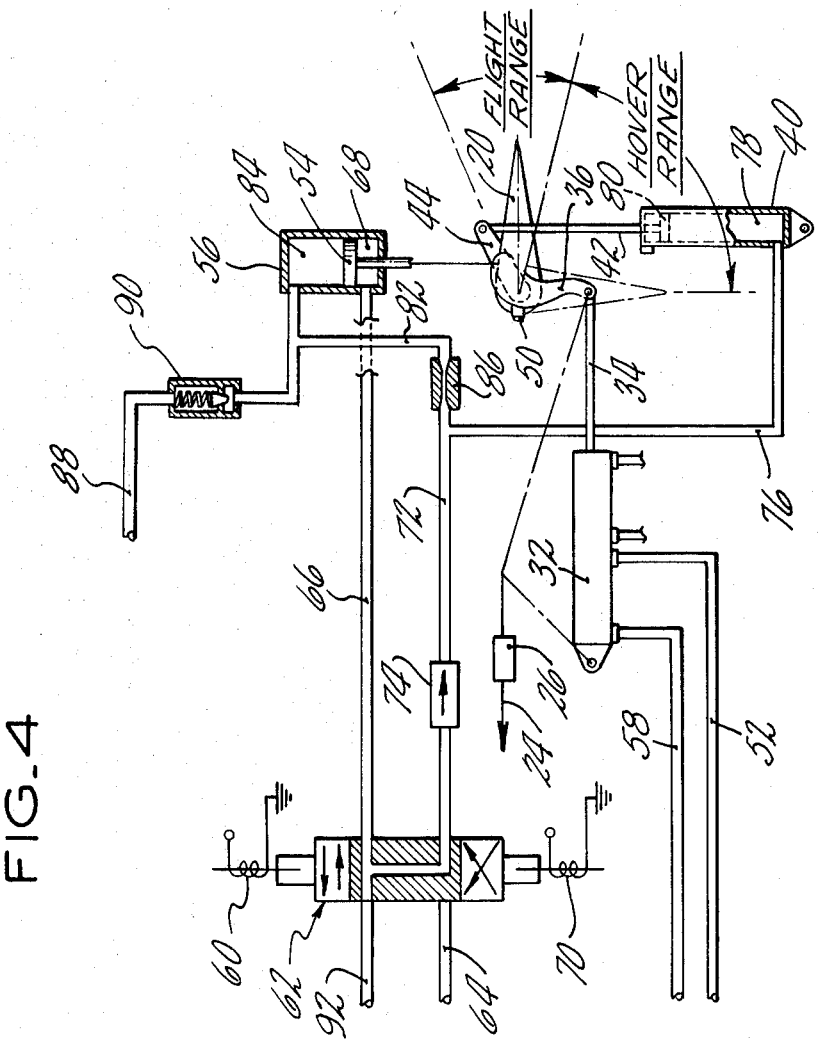
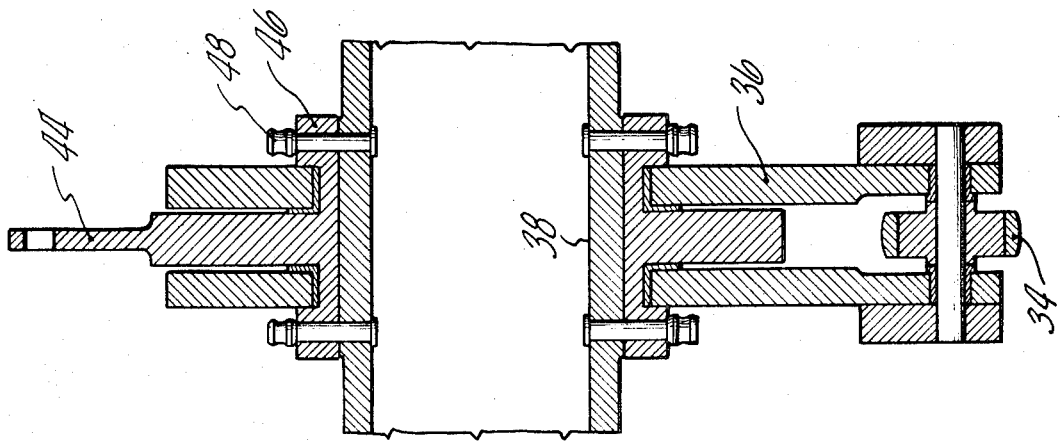
FIG. 4
FIG. 3

HELICOPTER FLOATING STABILATOR CONTROL SYSTEM

BACKGROUND OF THE INVENTION

1. Field of the Invention

This invention relates to a flight control system for a helicopter and more particularly to a system for freeing a horizontal stabilizer or stabilator from controlled movement during certain flight operation.

2. Description of the Prior Art

In helicopter structures a horizontal stabilizer of some type may be employed to assist in providing stability to the aircraft and for maneuvering control. It is a usual practice for helicopter manufacturers to attach stabilizers to the airframe body in a fixed angle of attack relationship. The particular angle of attack may be determined on the basis of experimentation or flight test for the normal flight condition of the aircraft. Occasionally the mounting for the stabilizer may include an adjustment feature whereby a mechanic on the ground may loosen the mounting and adjust the stabilizer to a different position. While free floating or active-inactive horizontal stabilizers have been used in aircraft, an example being Auster et al. U.S. Pat. No. 2,712,420, there is a specific need in the flight operation of a helicopter to provide a stabilizer which may be adjusted in forward flight in accordance with maneuverability control inputs made by the pilot by means of the cyclic pitch control system and which also can be rotated for the hover mode of operation to a position where it offers minimum air resistance or vertical drag and is disconnected from the control inputs. The requirement for the helicopter to achieve greater forward flight speeds while still retaining its capability to perform an efficient hover operation is the basis for this need.

SUMMARY OF THE INVENTION

An object of the present invention is to provide an improved helicopter flight control system.

Another object of the invention is to provide a helicopter flight control system utilizing a horizontal stabilizer which has two phases of operation; one being in accordance with changes in rotor blade pitch and the other being free floating with the stabilizer being positioned in accordance with rotor downwash so as to offer minimum air resistance during certain helicopter maneuvering.

Still another object of the invention is to provide a helicopter flight control system having a horizontal stabilizer which is directly controlled by the cyclic pitch stick and which may be selectively disengaged from cyclic pitch control so that it may seek a position of minimum vertical drag with provision for restoring the stabilizer to controlled movement at will.

In accordance with the present invention, a helicopter is provided with a floating type horizontal stabilizer or stabilator, the position of which can be adjusted during flight operation in accordance with cyclic pitch stick movements so that a tendency of the helicopter fuselage to pitch up or down can be resisted and the fuselage can be kept level or in line with the plane of rotation of the rotor and thus reduce bending loads. During hover operation, it is desirable to permit the stabilator to be moved to a vertical position so that the downwash from the rotor would have a minimum effect on the stabilator. It may be desirable to include in the cyclic pitch connection to the stabilator a trim capability so that adjustments can be made for variations in the center of gravity of the helicopter.

The foregoing and other objects, features and advantages of the invention become more apparent in the light of the following detailed description of a preferred embodiment thereof, as illustrated in the accompanying drawings.

BRIEF DESCRIPTION OF THE DRAWINGS

FIG. 1 is a simplified schematic drawing of a helicopter showing the stabilator structure in the tail area.

FIG. 2 is an enlarged fragmentary portion of the rear of the helicopter of FIG. 1 showing the cyclic pitch linkage connection to the stabilator in some detail.

FIG. 3 is an enlarged section through the stabilator showing details of its coupling arrangement.

FIG. 4 is a circuit diagram of the hydraulic system for the stabilator control system.

DESCRIPTION OF A PREFERRED EMBODIMENT

Referring to FIG. 1, the helicopter 10 is shown which has rotor 12 driven by one or more engines within compartment 4. The rotor has a plurality of blades 16, the pitch of which can be adjusted. Controls for the helicopter comprise normal helicopter controls including cyclic pitch stick 18 in the pilot's compartment which is operatively connected to rotor blades 16 and which is also connected to stabilator 20 as will be explained below. The helicopter also has tail rotor 22.

FIG. 2 shows in detail the coupling of the cyclic pitch control linkage to the stabilator. Cyclic pitch connector 24 is connected through trim actuator 26 and a series of bell cranks and rods such as bell crank 28 and rod 30 to stabilator control actuator 32 which is essentially a servo. The trim actuator may be used for introducing adjustment to the cyclic pitch connection to compensate, for example, for changes in the location of the center of gravity of the helicopter. Rod 34 extending from the control actuator is connected to floating crank 36 surrounding stabilator torque tube 38. This connection is also shown in FIG. 3. The torque tube is an integral part of the stabilator and its axis is the axis about which the stabilator rotates.

Droop actuator 40 is pivotally anchored at its lower end and is connected by piston rod 42 extending upward therefrom to fixed crank 44 also surrounding torque tube 38 and having flange 46 connected to the torque tube by one or more bolts 48 (FIG. 3). Floating crank 36 actually surrounds fixed crank 44 and is journaled on flange 46. The two cranks 36 and 44 have a common axis of rotation with torque tube 38, and crank 36 is capable of relative rotational movement with respect to crank 44 and torque tube 38. Locking pin arrangement 50, indicated in FIG. 2, is provided for selectively locking cranks 36 and 44 together so that they can rotate as a unit or selectively unlocking them so that one crank can rotate with respect to the other. When the two cranks are joined by the locking pin, position of stabilator 20 is adjusted in accordance with longitudinal movement of cyclic pitch stick 18. When they are not joined together, the stabilator is free to rotate about the torque tube axis, and the downwash from rotor blades 16, as when helicopter 10 is in a hover, will cause the stabilator to rotate in a clockwise direction until it assumes substantially a vertical position.

In the diagram of FIG. 4, high pressure fluid is admitted through line 52 to the servo valve in stabilator control actuator 32 to provide the muscle for actuation of stabilator 20 in response to cyclic pitch stick inputs through connector 24 or actuation of trim actuator 26. During such operation, no fluid pressure is applied to droop actuator 40 or to the locking pin which is not shown in the figure but is understood to be operatively connected to piston 54 in lock power cylinder 56. The locking pin, however, would be retained as through a spring loading in a lock position so that floating crank 36 and fixed crank 44 are locked together and the position of the stabilator is adjusted in accordance with rotational movement of floating crank 36. Line 58 is a drain line from the servo in control actuator 32. The control actuator may also have separate fluid lines connecting it to automatic stabilization equipment for automatic control of the stabilator position.

When it is desired to free stabilator 20 from cyclic pitch control so that the stabilator can float and assume a free position, switch 60 located in the pilot's compartment is actuated to position valve 62 to admit fluid pressure from supply line 64 to line 66. This line is connected to chamber 68 in the lower portion of lock power cylinder 56 and the fluid pressure admitted there will act on the lower face of piston 54 to move the piston upward with resulting disengagement of the locking pin holding cranks 36 and 44 together. Stabilator 20 then will be free to assume a position in accordance with the aerodynamic loads imposed thereon.

When the stabilator is floating and it is desired to bring it under the control of the cyclic control system, switch 70 also located in the pilot's compartment is actuated to position valve 62 to admit fluid pressure from supply line 64 to line 72. The line has flow regulator 74 therein for reducing the pressure through the fluid lines downstream of that point to that required by the droop actuator 40. Branch line 76 connects line 72 to the bottom end of droop actuator 40 so that pressure fluid admitted to chamber 78 within the actuator acts on the lower face of piston 80. The chamber at the top side of the piston is vented. Branch line 82 is connected to chamber 84 at the top side of piston 54 within lock power cylinder 56. Restriction 86 in branch line 82, downstream of the junction with branch line 76 delays the admission of pressure fluid to chamber 84 when pressure fluid is admitted by valve 62 to line 72 until after fluid pressure in droop actuator chamber 78 has started to move piston 80 upward.

Both branch lines 76 and 82 are connected to drain line 88 which has relief valve 90 therein. This valve prevents an excessive pressure buildup in the pressure fluid system after piston 80 through its connection with fixed crank 44 has moved stabilator 20 to a position aligning the locking holes in floating crank 36 and fixed crank 44, and piston 54 has moved the locking pin to a locked position. At the time the locking pin has closed, a signal is transmitted to valve 62, causing a shift in valve position so as to shut off the admission of fluid pressure to line 72 and to vent that line and lines 76 and 82 to drain line 92. This will vent chambers 78 and 84, to the drain line, and control of the position of stabilator 20 then will be in accordance with the cyclic pitch control system. In the figure, valve 62 is schematically shown in this drain position.

Although the invention has been shown and described with reference to a preferred embodiment, it should be understood by those skilled in the art that the foregoing and other changes and omissions in the form and detail thereof may be made therein without departing from the spirit and scope of the invention, which is to be defined and limited only as set forth in the following claims.

I claim:

1. A flight control system for a helicopter having a bladed rotor and a stabilator:
   cyclic means for controlling the pitch of said rotor blades;
   means coupling said cyclic pitch controlling means and said stabilator so that the position of said stabilator is adjusted in accordance with cyclic pitch; and
   means for uncoupling said stabilator so that it is free floating.

2. The combination of claim 1 further including:
   means for trimming said cyclic pitch controlling means.

3. A flight control system for a helicopter having a bladed rotor and a stabilator;
   cyclic means for controlling the pitch of said rotor blades;
   first means operatively connected with said cyclic pitch controlling means;
   second means operatively connected with said stabilator; and
   means for selectively connecting together said first and second means so that position of said stabilator is adjustable in accordance with cyclic pitch.

4. A stabilator for a helicopter having a bladed rotor:
   said stabilator including a first crank fixedly connected thereto;
   fluid pressure means for actuating said first crank and changing the position of said stabilator;
   second crank means associated with said stabilator;
   means for cyclic pitch control of said bladed rotor;
   means connecting said second crank means and said cyclic pitch control means for adjusting the position of said second crank;
   means for locking said first and second crank means together;
   fluid pressure means for actuating said locking means;
   means for unlocking said locking means when said first and second crank means are locked together;
   means for admitting fluid pressure to said first crank fluid actuating means and to said locking means to lock said first and second crank means together; and
   means for delaying admission of fluid pressure to said locking means until fluid pressure is admitted to said first crank fluid actuating means.

5. For a helicopter having a bladed rotor, a stabilator and cyclic pitch control means;
   a flight control system for said stabilator including;
   first means connected to said stabilator;
   means connected to said first means for moving said stabilator;

second means connected to said cyclic pitch control means;

means for locking said first and second means together so that said stabilator can be moved in accordance with cyclic pitch inputs; and means for selectively controlling the position of said stabilator in accordance with cyclic pitch input, unlocking said locking means so that said stabilator is unrestrained, and for returning said stabilator to the control of cyclic pitch input.

6. For a helicopter having a bladed rotor, cyclic pitch control means, and a stabilator the position of which can be varied;

means for adjusting position of said stabilator in accordance with cyclic pitch;

means for freeing said stabilator from cyclic control so that it can assume a position in accordance with aerodynamic loads thereon; and means for reestablishing cyclic pitch control of said stabilator when it is free floating.

7. The combination of claim 1 further including:

means for trimming the position of said stabilator as established by cyclic pitch.

8. In a helicopter having a stabilizer, a stabilizer in-flight adjustment system comprising an actuator connected to the stabilizer by a first crank member, a second crank member freely mounted on the stabilizer axis adjacent the first crank member, a flight control linkage connected to the second crank member, an engage / disengage lock mounted to interconnect said crank members, an actuator control valve, an unlocking switch, and sequencing means between the actuator and the lock.

* * * * *